T. GOLDE.
HINGED VEHICLE HOOD.
APPLICATION FILED FEB. 15, 1912.

1,034,905.

Patented Aug. 6, 1912.

WITNESSES:

INVENTOR
Traugott Golde
BY
Briesen & Knauth
ATTORNEY

UNITED STATES PATENT OFFICE.

TRAUGOTT GOLDE, OF PASSAIC, NEW JERSEY.

HINGED VEHICLE-HOOD.

1,034,905.  Specification of Letters Patent.  Patented Aug. 6, 1912.

Application filed February 15, 1912. Serial No. 677,709.

*To all whom it may concern:*

Be it known that I, TRAUGOTT GOLDE, a subject of the Prince of Reuss, Younger Line, residing at Passaic, in the county of Passaic and State of New Jersey, have invented a new and Improved Hinged Vehicle-Hood, of which the following is a specification.

This invention relates to a vehicle hood for automobiles and other vehicles, which may be readily manipulated, and is securely sustained in its open position.

Figure 1:
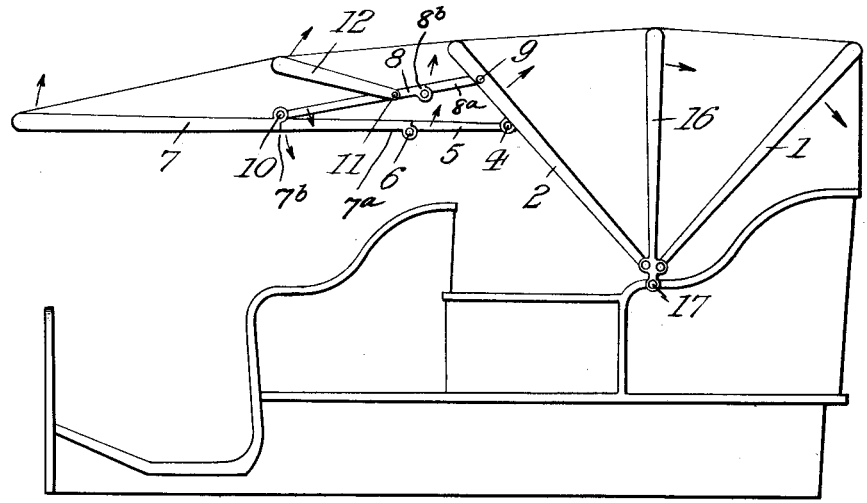
Figure 2:
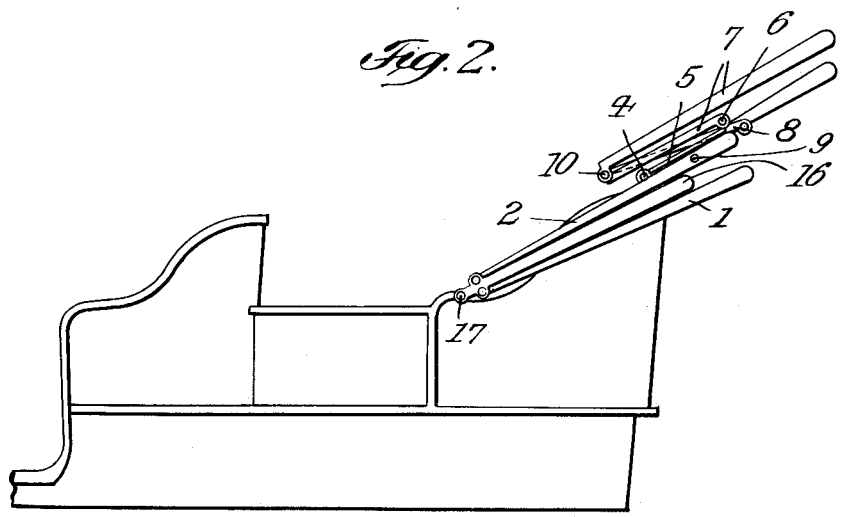

In the accompanying drawing: Figure 1 is a side view of a vehicle hood embodying my invention, showing it open, and Fig. 2 a similar view showing it folded.

The hood comprises a pair of rear bows 1 and 2 pivoted to a supplemental bow 16 which is in turn pivoted to the carriage body at 17. To bow 2, there are pivoted at 4, a pair of forwardly extending arms 5 to the forward ends of which there are pivoted at 6, the rear members 7ª of an articulated outrigger bow 7 having hinges 7ᵇ. To bow 7 are pivoted at 10, the front members 8 of a pair of bipartite diagonal braces, the rear members 8ª of which are pivoted at their forward ends to front members 8 at 8ᵇ and at their rear ends to bow 2 at 9. An intermediate bow 12 is pivoted to the front members 8 of the bipartite braces at 11 some distance in front of pivots 8ᵇ.

It will be seen that by the construction described, the top will be securely sustained, that the hinges are relieved from excessive strain, and that the device may be accurately folded and unfolded.

I claim:

A vehicle hood comprising a rear bow, a pair of arms pivoted thereto, an articulated outrigger bow having hinged rear members that are pivoted to the arms, a pair of bipartite diagonal braces having front and rear members that are respectively pivoted to the outrigger bow and to the rear bow, and an intermediate bow pivoted to the front members of said bipartite braces.

TRAUGOTT GOLDE.

Witnesses:
 FRANK V. BRIESEN,
 KATHERYNE KOCH.